United States Patent
Jacobs et al.

(12)

(10) Patent No.: US 6,597,152 B1
(45) Date of Patent: Jul. 22, 2003

(54) BATTERY CHARGER SPLITTING ADAPTER

(75) Inventors: Barry Howard Jacobs, Forest Park, IL (US); Peter Neumann, Chicago, IL (US)

(73) Assignee: S-B Power Tool Corporation, Broadview, IL (US)

( * ) Notice: Subject to any disclaimer, the term of this patent is extended or adjusted under 35 U.S.C. 154(b) by 0 days.

(21) Appl. No.: 10/226,840

(22) Filed: Aug. 23, 2002

(51) Int. Cl.⁷ .................................................. H02J 7/00
(52) U.S. Cl. ........................................ 320/113; 320/107
(58) Field of Search ................................ 320/113, 111, 320/107, 110, 112, 125; 429/96, 99, 100

(56) References Cited

U.S. PATENT DOCUMENTS

| | | | |
|---|---|---|---|
| 4,213,079 A | 7/1980 | Mullersman | 320/111 |
| 4,558,270 A * | 12/1985 | Liautaud et al. | 320/110 |
| 5,039,929 A | 8/1991 | Veistroffer et al. | 320/107 |
| 5,592,064 A | 1/1997 | Morita | 320/110 |
| 5,734,253 A | 3/1998 | Brake et al. | 320/125 |
| 6,104,162 A | 8/2000 | Sainsbury et al. | 320/111 |
| 6,191,552 B1 | 2/2001 | Kates et al. | 320/112 |
| 6,204,632 B1 | 3/2001 | Nierescher et al. | 320/116 |
| 6,265,845 B1 * | 7/2001 | Bo et al. | 320/113 |
| 6,320,353 B1 | 11/2001 | Chiu et al. | 320/111 |

* cited by examiner

*Primary Examiner*—Lawrence Luk
(74) *Attorney, Agent, or Firm*—Greer, Burns & Crain, Ltd.

(57) ABSTRACT

A splitting adapter for a battery charger having a power cord for connection to an electrical source, the charger having a single charging receptacle for receiving a connector extension of a battery pack of the type used with cordless power tools, said adapter including a housing having a housing connector extension with a sufficiently similar structural and electrical configuration as the connector extension of the battery pack so that the housing can be electrically connected to the battery charger when said housing connector extension is inserted into the charging receptacle. The splitting adapter also includes at least two charging receptacles, each of which is configured to receive a battery pack connector extension, where the charging receptacles are spaced from one another a sufficient distance that the battery packs will not interfere with one another when inserted into the adapter.

12 Claims, 9 Drawing Sheets

BATTERY CHARGER SPLITTING ADAPTER

BACKGROUND OF THE INVENTION

The present invention relates generally to battery chargers, and more specifically relates to an adapter apparatus for battery chargers used with cordless power tools.

There has been continued innovation in the field of battery chargers that are used with cordless power tools. Examples of such battery chargers are those produced under the SKIL and BOSCH brands by the S-B Power Tool Corporation of Chicago, Ill., which are used with various cordless power tools also produced under the same brands. A typical battery pack ordinarily has a generally rectangular housing and a male stem connector extending from a surface thereof. The battery chargers ordinarily used for charging these battery packs are correspondingly sized and configured to contain a female slot for receiving the stem connector of the battery pack. The battery packs are further equipped with terminals for establishing electrical contact with mating terminals that are configured on an internal circumference of the female slot of the battery charger.

In addition to the power tool itself, a power tool kit will often include two battery packs and a single battery charger, which is capable of charging only a single battery pack at a time. Heavy users will frequently purchase additional battery packs. Having multiple battery packs of a given type enables the user to continuously use the cordless power tool by swapping out depleted battery packs for fully charged battery packs. However, users typically have more battery packs than they have chargers, which prevents optimal charging of multiple battery packs at one time. This results an in inconvenience to the user, who must instead serially charge the battery packs. Moreover, the most common type of power tool battery pack uses Nickel-Cadmium (NiCd) batteries, which lose their charge over time when the battery packs are not inserted into a charger. Thus, users of conventional battery chargers are unable to maintain the charge in the battery packs during periods when the batteries are not in use.

SUMMARY OF THE INVENTION

The present invention relates to a particularly efficient adapter apparatus for use with battery chargers for cordless power tools for allowing the user to charge multiple battery packs using a single charger. The present adapter apparatus couples to a battery charger and comprises a generally rectangular housing having a top portion and a bottom portion, with at least two female charging receptacles on the top portion, each charging receptacle being configured to receive a male stem connector of the battery pack. The bottom portion of the adapter also includes a male stem connector that is sized and configured to be received by a correspondingly sized and configured female charging receptacle in the battery charger. The battery charger is coupled to an AC outlet via a power cord extending from a rear surface of the battery charger.

DETAILED DESCRIPTION OF THE INVENTION

Figure 1:
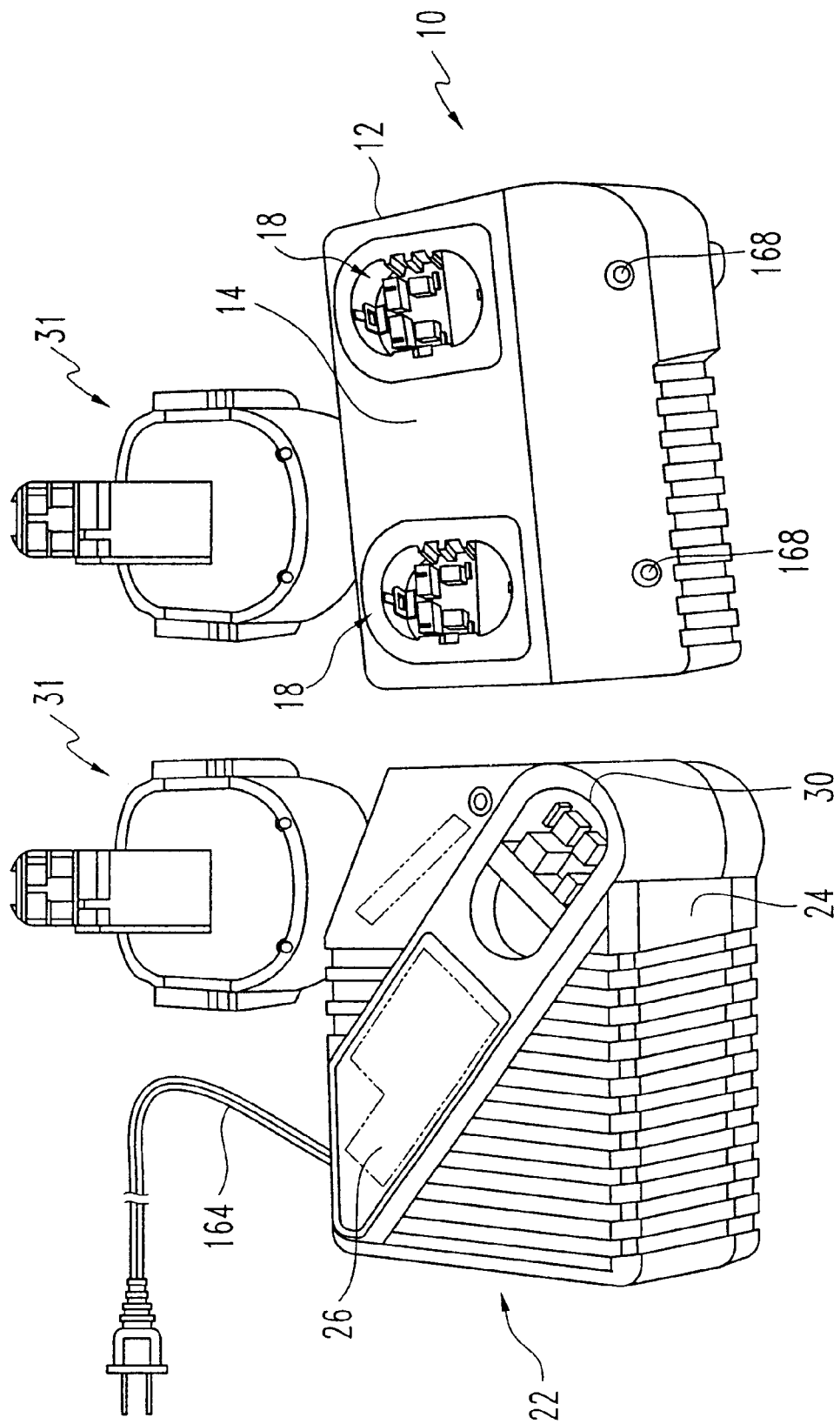
FIG. 1 is top perspective view of the adapter apparatus of the instant invention shown with a battery charger and battery packs.

Turning now to FIGS. 1–8, the preferred embodiment of the present adapter apparatus is indicated generally at 10 and includes a generally rectangular adapter housing 12 having a top surface portion 14 and a bottom surface portion 16, where at least two female charging receptacles 18 are disposed on the top portion. Disposed on the bottom surface portion 16 is a male stem connector 20. The adapter apparatus 10 is coupled to a battery charger apparatus 22 having a charger housing 24, a charger top portion 26, and a charger bottom portion (not shown), wherein the charger top portion includes a single female slot 30 at a top surface thereof. In the absence of the adapter apparatus 10 of the instant invention, a battery pack 31 is ordinarily coupled directly to the battery charger apparatus 22 used in conjunction with the instant invention. Thus, the adapter apparatus 10 of the instant invention acts as a mechanical and electrical intermediary between the charger apparatus 22 and the battery pack 31, and accordingly includes features sized and configured to mimic the insertion of a battery pack within the charger apparatus and the receiving of a battery pack within the adapter apparatus.

Figure 5:
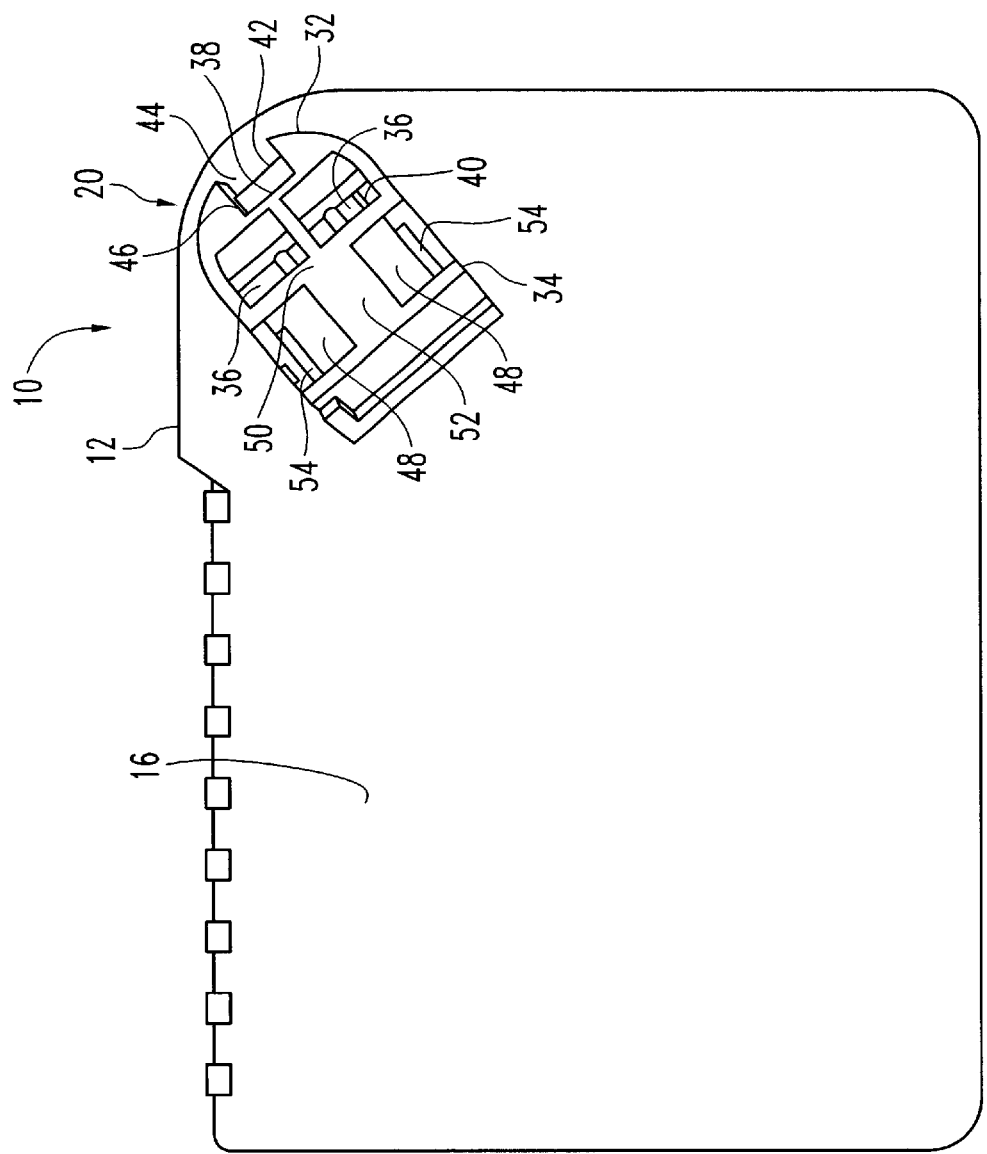
FIG. 5 is a bottom view of the adapter apparatus illustrated in FIG. 1.
Figure 6:
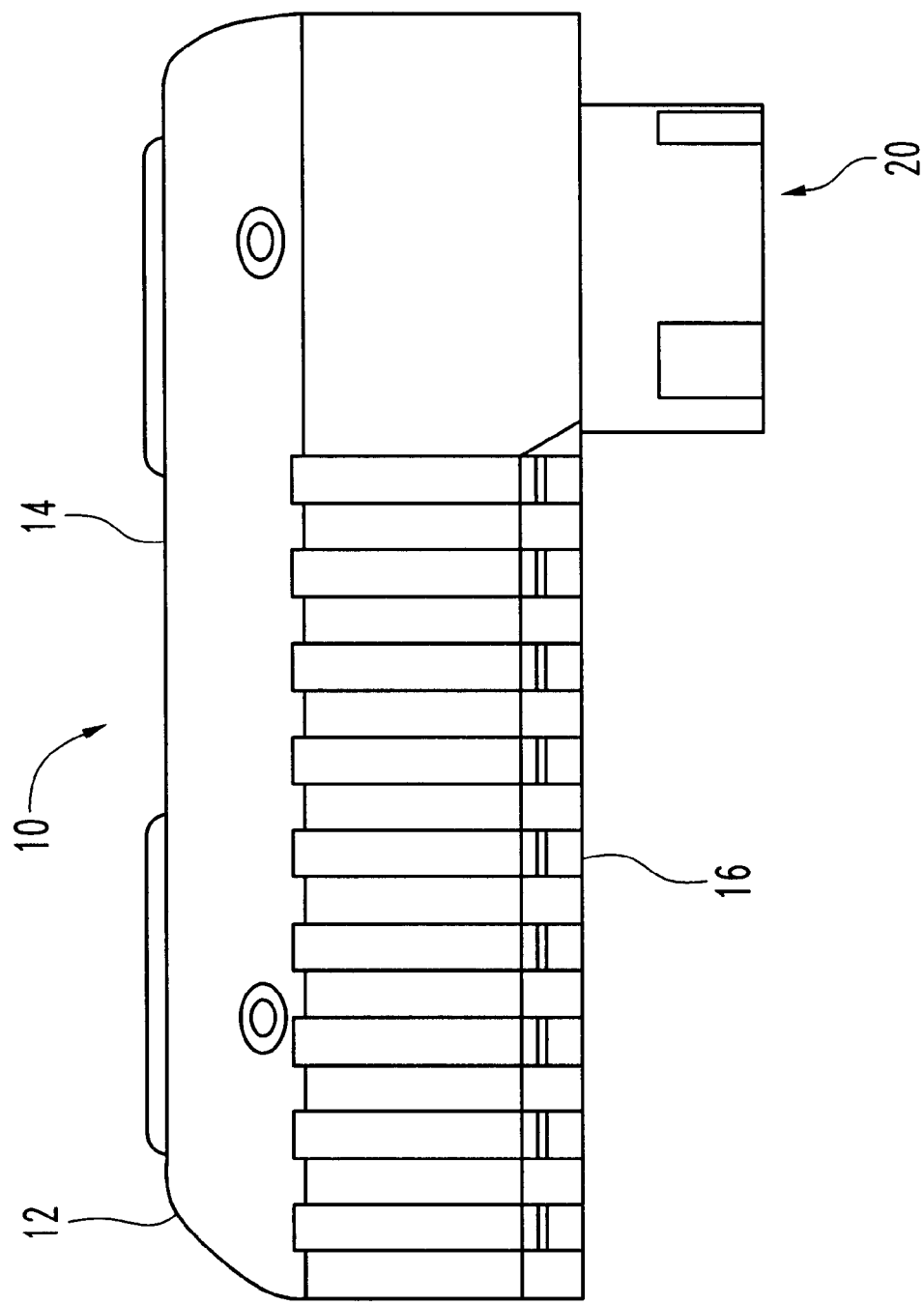
FIG. 6 is a side view of the adapter apparatus illustrated in FIG. 1.
Figure 7:
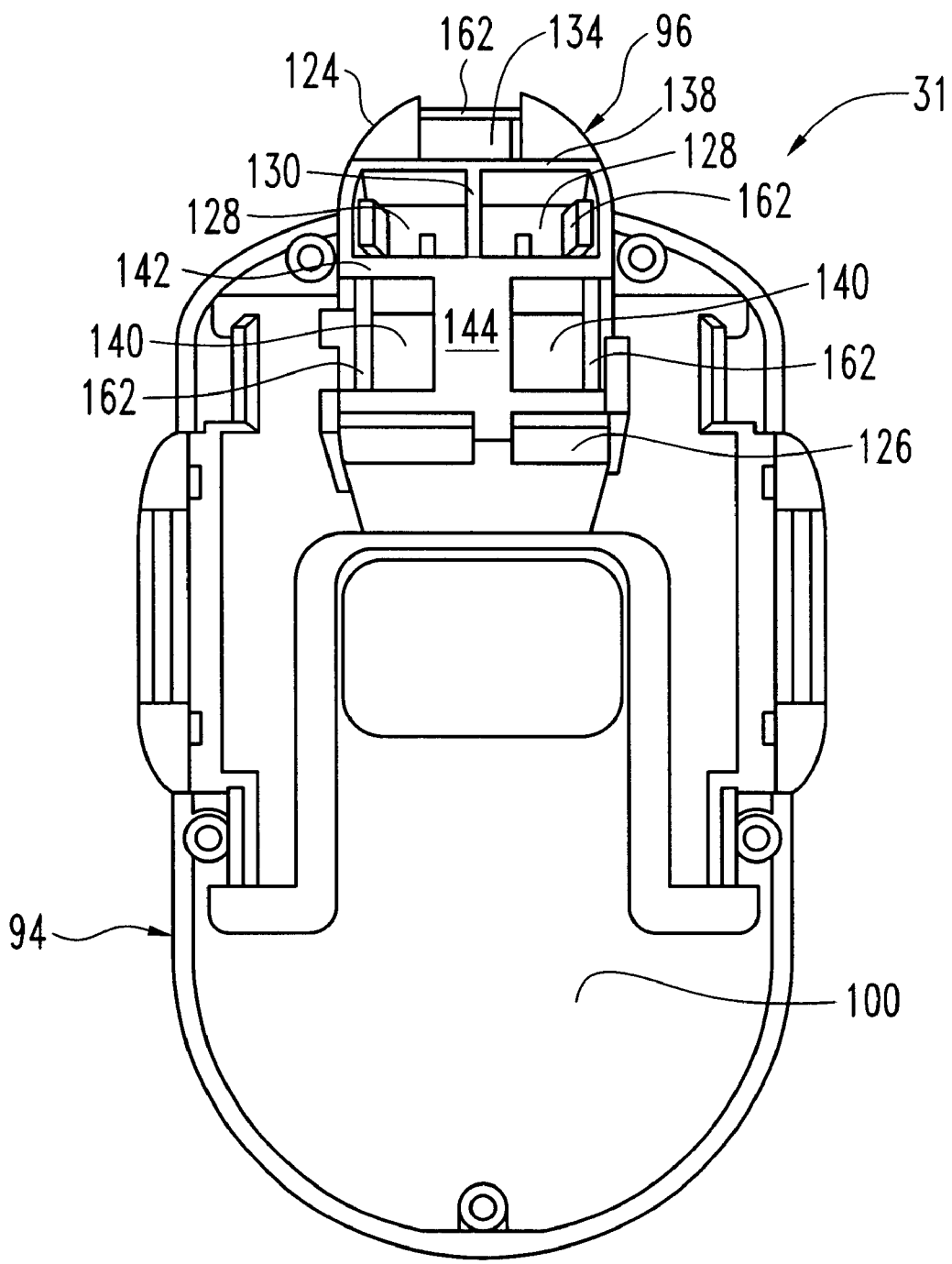
FIG. 7 is a bottom view of the battery pack illustrated in FIG. 1.
Figure 8:
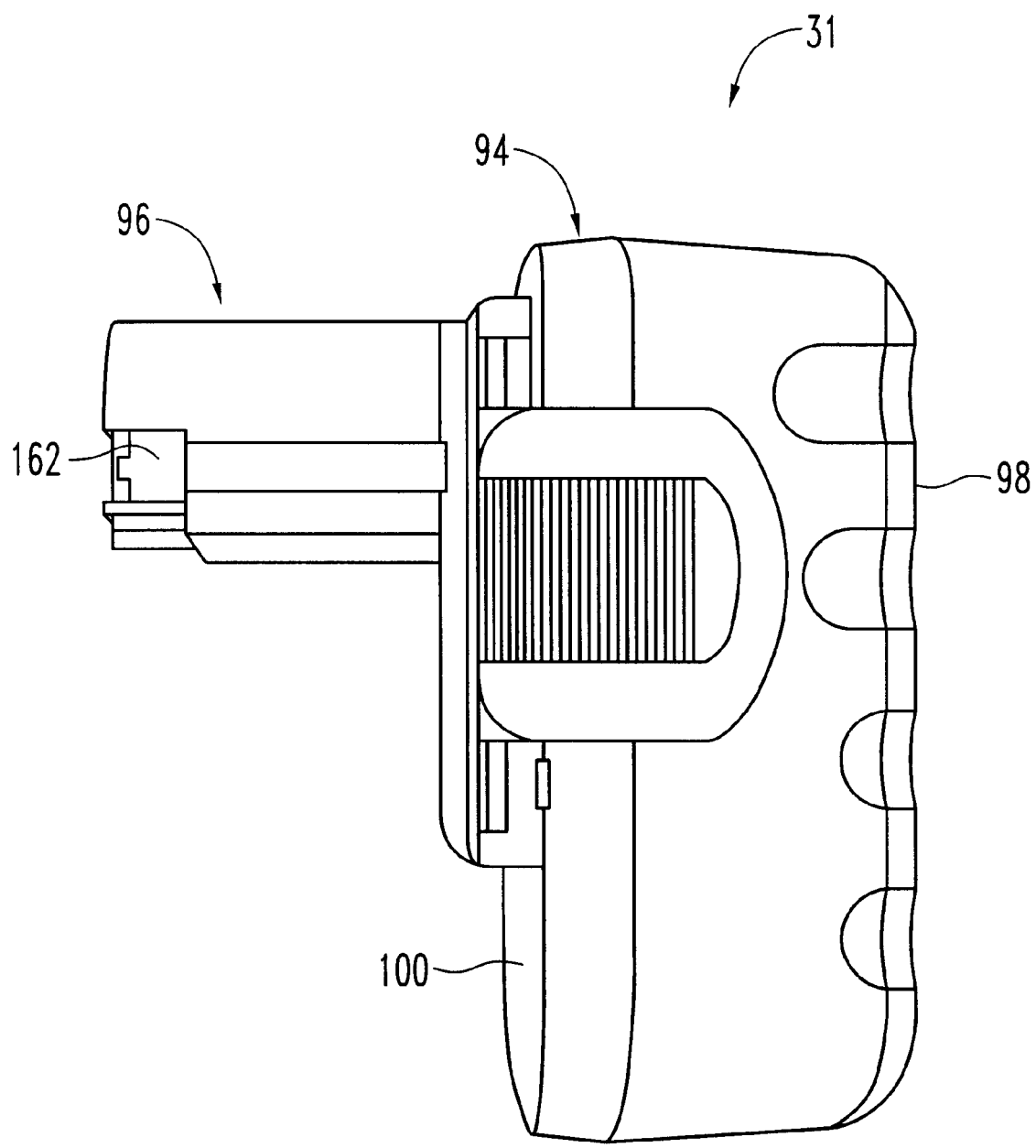
FIG. 8 is a side view of the battery pack illustrated in FIG. 1.

To couple the adapter apparatus 10 to the battery charger apparatus 22, and referring to FIG. 5, the stem connector 20 of the adapter apparatus matingly engages the single female slot 30 on the charger top portion, which is sized and configured to receive the stem connector of the adapter apparatus. To this end, the stem connector 20 of the adapter apparatus 10 is configured to matingly engage the female slot 30 of the charger apparatus 22. The stem connector 20 includes a first end portion 32 and a second end portion 34 that are configured to be unitary with one another, wherein the first end portion is generally arcuate at its circumferential edge, and the second end portion is generally rectangular at its circumferential edge. In the preferred embodiment of the instant invention, stem connector 20 is disposed in a corner portion of the bottom surface portion 16 of adapter apparatus 10, with the arcuate first end portion 32 nearest an edge of the bottom surface portion and the generally rectangular second end portion 34 nearest a center of the bottom surface portion. Preferably, the stem connector 20 is configured and arranged so that a longitudinal axis of the stem connector generally bisects the plane of the bottom surface portion 16 in a diagonal direction.

The arcuate first end portion 32 of the stem connector 20 includes a pair of generally rectangular female cavities 36 that are adjacent one another on either side of a first wall 38 separating them. At least one of the pair of female cavities 36 includes a slot 40 at a bottom surface thereof. Disposed above the pair of female cavities 36 is a top channel 42, which is a three sided depression having an open front edge, and includes a front slot 44 extending downward from a bottom surface of the top channel. The top channel 42 is separated from the female cavities 36 by a second wall 46. Disposed below the pair of generally rectangular female cavities 36 is a pair of second female channels 48 that are separated from the female cavities by a third wall 50 and separated from each other by a fourth wall 52. The second female channels 48 are open at an edge opposite the common fourth wall 52, and each second female channel has a side slot 54 extending downward from a bottom surface of the second female channels.

Accordingly, the single female slot 30 of the battery charger (see FIG. 3) is disposed in a corner portion of the top portion 26 of the battery charger apparatus 22. The female slot 30 is generally obround in shape, being generally rectangular with top and bottom arcuate end portions 56, 58. The top arcuate end portion 56 is sized and configured to have a radius of curvature corresponding to a radius of curvature of the first portion 32 of the stem connector 20. A bottom surface of the female slot 30 is divided into a first surface portion 60 and a second surface portion 62, wherein the second surface portion is elevationally higher than the first surface portion with respect to the top portion 26 of the battery charger apparatus 22. The second surface portion 62 therefore is a shelf-like surface within the female slot 30, and has an arcuate end coextensive with the bottom arcuate end portion 58 of the female slot 30 and a generally linear front edge 64. The linear front edge 64 is sized and configured to correspond to the second portion 34 of the stem connector 20. Thus, the female slot 30 is sized and configured to nestingly engage with stem connector 20 wherein the top arcuate end portion 56 abuts the correspondingly sized and configured first portion 32 of the stem connector 20 and the linear front edge 64 of the of the second surface portion 62 of the female slot 30 abuts the second portion 34 of the stem connector 20. Moreover, the female slot 30 is preferably disposed on the battery charger apparatus 22 in an orientation similar to the orientation of the stem connector 20 on the adapter apparatus 10. Specifically, the top arcuate end portion 56 is most proximate an edge of the battery charger apparatus 22 whereas the bottom arcuate end portion 58 is most distal, and a longitudinal axis extending therebetween generally bisects the battery charger apparatus in a diagonal direction.

In the preferred embodiment, the surfaces of both the female slot 30 and the stem connector 20 are configured to matingly engage one another. Extending from the first surface portion 60 of the bottom surface of the female slot 30 are a plurality of male projections, including a pair of rear slotted projections 66, a pair of generally middle projections 68, and a front slotted projection 70. The rear slotted projections 66 are generally rectangular and oppose one another along an inner circumference of the female slot 30 and are unitary with the circumference but separated from one another at sides most proximate one another by a portion of the first surface portion 60. Each rear slotted projection 66 includes a slot portion 72 running therethrough in a direction generally parallel to the longitudinal axis of the female slot 30, and each slot portion includes two side walls and a bottom wall, but are preferably open at the front and rear sides. The pair of middle projections 68 are also generally rectangular and are disposed above the rear slotted projections 66, separated by a portion of the first surface portion 60 of the bottom surface. Like the rear slotted projections 66, the middle projections 68 are separated from one another at sides most proximate to one another by a portion of the first surface portion 60. The sides of the middle projections 68 that are most distal to one another include generally rectangular cavities 74 having four side walls and a bottom wall. The front slotted projection 70 is preferably disposed above the middle projections 68 having a front wall that abuts an inner circumferential surface of the female slot 30 and a rear wall that is separated from the front wall by a slot portion 76 extending the width of the front slotted projection 70 in a direction generally perpendicular to the direction of the slot portion 62 of the rear slotted projection 66.

Therefore, when the stem connector 20 is inserted into the female slot 30, the top channel 42 of the stem connector 20 nestingly receives the front slotted projection 70. Each of the female cavities 36 nestingly receives a corresponding one of the middle projections 68. Similarly, each of the second female channels 48 nestingly receives a corresponding one of the rear slotted projections 66. Additionally, an internal circumferential surface of the female slot 30 of the charger apparatus 22 preferably includes at least two guide ribs 78, wherein a single guide rib is vertically disposed at each of the top and bottom arcuate end portions 56, 58, and are configured to oppose one another along the internal circumference of the female slot. A plurality of side wall guide ribs 80, preferably three, are also disposed on the internal circumferential surface of the female slot 30 along a side wall portion. Opposite the side wall portion containing the side wall guide ribs 80 is a guide channel 82 defined on each side by generally planar raised portions 84. The stem connector 20 of the adapter apparatus 10 includes corresponding projections and recesses that engage these configurations on the internal circumferential surface of the female slot. In this manner, the stem connector 20 is mechanically coupled to the female slot 30.

Electrical coupling between the stem connector 20 and the female slot 30 is also established via a plurality of terminal connectors disposed within the various projections of each. More specifically, the stem connector 20 generally includes a terminal contact (not shown) disposed within the at least one slot 40 of the female cavities 36, the front slot 44 within the top channel 42, and the side slots 54 of each of the pair of second female channels 48. The terminal contacts (not shown) of the preferred embodiment are made of steel, but it is contemplated that the terminal contacts may be made from any electrically conductive metal typically used in batteries. The terminal contacts engage a respective slot or cavity disposed within the female slot 30. More specifically, the slot portion 72 disposed within the rear slotted projections 66 matingly engage the terminal contacts within the second female channels 48, the cavities 74 disposed within the middle projections 68 matingly engage the terminal contacts of the female cavities 36, and the slot portion 76 of the front slotted projection 70 matingly engages the terminal contact within the top channel 42.

Generally, the adapter apparatus 10 includes physical configurations that mimic the insertion of a battery, thus adapting the battery charger to receive multiple battery packs within the charging receptacles 18 on the adapter apparatus. Numerous conventional commercial battery packs are contemplated for use with the instant invention. In the preferred embodiment of the instant adapter apparatus 10, an 18-volt power tool battery manufactured by S-B Power Tool of Chicago, Ill. is used. Typically, a battery pack 31 of the type used with the instant invention a main power pack 94 and a stem connector 96 for establishing and maintaining electrical coupling with adapter apparatus 10.

For purposes of description and illustration, the 18-volt battery having a main power pack 94 and a stem connector 96 will be shown and described. The power pack 94 includes a generally cylindrical housing and includes a first side 98 and a second side 100, where the stem connector 96 extends from an upper section of the second side 100 of the power pack 94 in a direction generally perpendicular to a plane of the second side 100. The first side 98 is disposed opposite of the second side 100. Since the battery pack 31 is typically either coupled with either the tool with which it is used or with a battery charger apparatus 22, the stem connector 96 of the battery pack 31 includes surface configurations at a distal end thereof that matingly correspond to the projections extending from a bottom surface of the female slot 30 on the battery charger apparatus. Accordingly, since the instant adapter apparatus 10 matingly engages the same battery pack 31 that is ordinarily coupled directly to the battery charger apparatus 22, the charging receptacles 18 disposed on top surface portion 14 of adapter apparatus 10 are sized and configured to mimic the female slot 30 of the charger apparatus.

Figure 4:
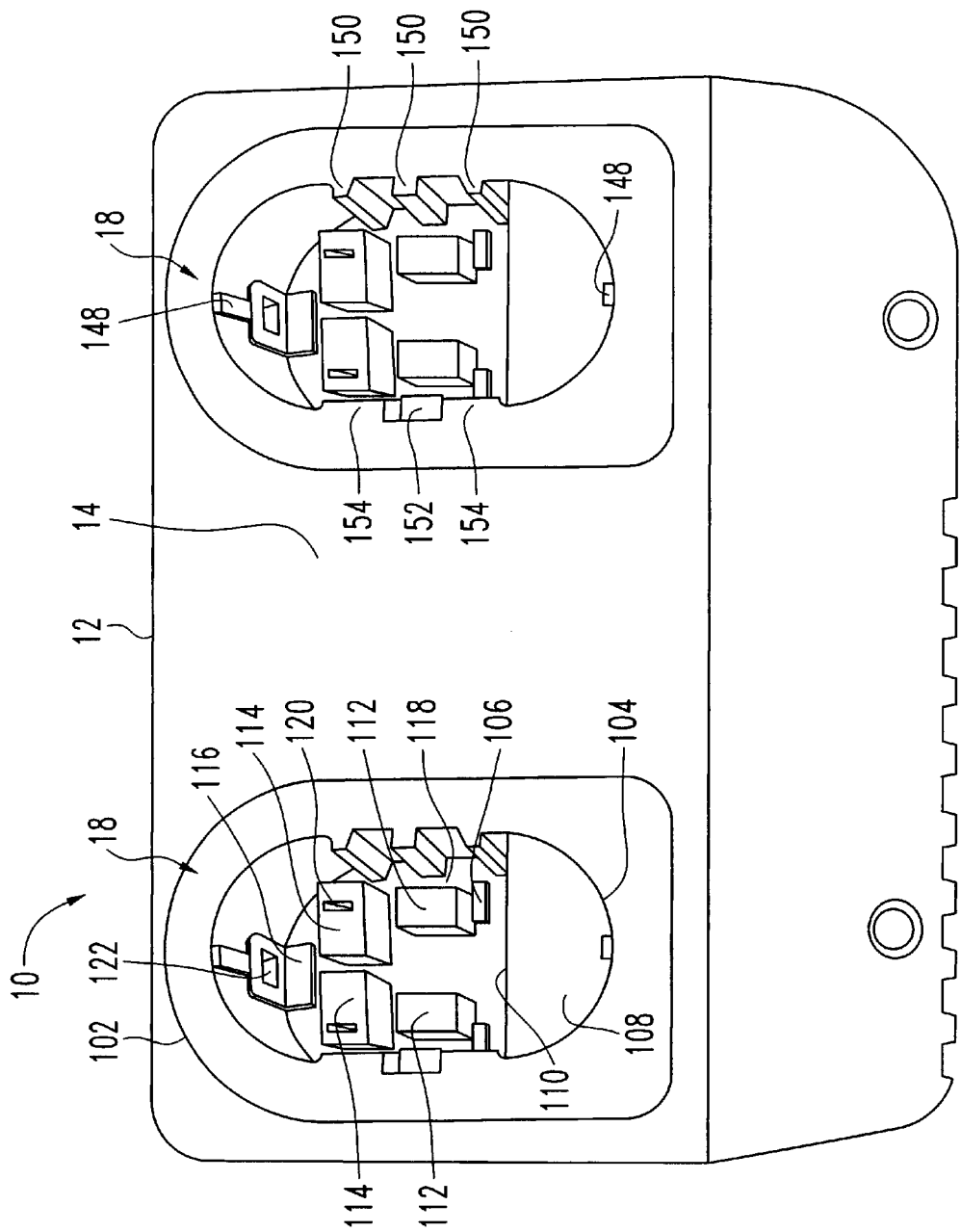
FIG. 4 is a top view of the adapter apparatus illustrated in FIG. 1.

In the preferred embodiment of the instant invention, and referring to FIG. 4, two charging receptacles 18 are disposed on the top surface portion 14 of the adapter apparatus 10 and are separated from one another by a portion of the top surface portion 14 sufficient to allow the second side 100 of the power pack 94 of one battery pack 31 to abut the surface of the top surface portion without contacting the power pack of a second battery pack. Like the female slot 30 on the charger apparatus 22, each of the charging receptacles is obround in shape, being generally rectangular but having arcuate top and bottom end portions 102, 104. The charging receptacles 18 are oriented so that the longitudinal axis of each is generally parallel to one another, with the arcuate top end portions 102 and arcuate bottom end portions 104 of each oriented in the same direction. The rectangular side portions are similarly generally parallel to one another. A bottom surface of each charging receptacle 18 is divided into a first surface portion 106 and a second surface portion 108 wherein the second surface portion is elevationally higher than the first surface portion with respect to the top surface portion 14 of the adapter apparatus 10. The second surface portion 108 therefore is a shelf-like surface within the charging receptacle 18, and has an arcuate end coextensive with the bottom arcuate end portion 104 of the charging receptacle and a generally linear front edge 110.

Extending from the first surface portion 106 of the bottom surface of the charging receptacle 18 are a plurality of male projections corresponding to those male projections extending from the first surface portion 60 of the female slot 30, including a pair of rear slotted projections 112, a pair of generally middle projections 114, and a front slotted projection 116. Like those disposed within the female slot 30 of the battery charger apparatus 22, the rear slotted projections 112 of the charging receptacle 18 are generally rectangular and oppose one another along an inner circumference of the charging receptacle 18 and are unitary with the circumference but separated from one another at sides most proximate one another by a portion of the first surface portion 106. Each rear slotted projection 112 includes a slot portion 118 running therethrough in a direction generally parallel to the longitudinal axis of the charging receptacle 18, and each slot portion includes two side walls and a bottom wall, but are preferably open at the front and rear sides. The pair of middle projections 114 are also generally rectangular and are disposed above the rear slotted projections 112, separated by a portion of the first surface portion 106 of the bottom surface. Like the rear slotted projections 112, the middle projections 114 are separated from one another at sides most proximate to one another by a portion of the first surface portion 106. The sides of the middle projections 114 that are most distal to one another include generally rectangular cavities 120 having four side walls and a bottom wall. The front slotted projection 116 is preferably disposed above the middle projections 114 having a front wall that abuts an inner circumferential surface of the charging receptacle 18 and a rear wall that is separated from the front wall by a slot portion 122 extending the width of the front slotted projection 116 in a direction generally perpendicular to the direction of the slot portion 118 of the rear slotted projection 112.

Just as the stem connector 20 of the adapter apparatus includes configurations that matingly engage corresponding configurations disposed within the female slot 30 of the battery charger apparatus 22, the stem connector 96 of the battery pack 31 includes configurations at a distal end thereof for mechanically and electrically coupling to corresponding configurations disposed within the charging receptacles 18. The configurations on the distal end of the stem connector 96 of the battery pack 31 are therefore similar to those disposed on the end of the stem connector 20 extending from the adapter apparatus.

The distal end of the stem connector 96 of the battery pack 31 includes a first portion 124 and a second portion 126 that are configured to be unitary with one another, wherein the first portion is generally arcuate at its circumferential edge, and the second portion is generally rectangular at its circumferential edge. The arcuate first portion 124 of the stem connector 96 includes a pair of generally rectangular female cavities 128 that oppose one another on either side of a first wall 130 separating them. At least one of the pair of female cavities 128 includes a slot (not shown) at a bottom surface thereof. Disposed above the pair of female cavities 128 is a top channel 134, which is a three sided depression having an open front edge, and includes a front slot (not shown) extending downward from a bottom surface of the top channel. The top channel 134 is separated from the female cavities 128 by a second wall 138. Disposed below the pair of generally rectangular female cavities 128 is a pair of second female channels 140 that are separated from the female cavities by a third wall 142 and separated from each other by a fourth wall 144. The second female channels 140 are open at an edge opposite the common fourth wall 144, and each second female channel has a side slot (not shown) extending downward from a bottom surface of the second female channels.

The engagement of the stem connector 96 of the battery pack 31 with the charging receptacles 18 of the adapter apparatus 10 is accomplished in the same manner as the engagement of the stem connector 20 of the adapter apparatus with the female slot 30 of the battery charger apparatus 22. When the stem connector 96 is slidably inserted into one of the charging receptacles 18, the top channel 134 of the stem connector nestingly receives the front slotted projection 116. Each of the rectangular female cavities 128 nestingly receives a corresponding one of the middle projections 114. Similarly, each of the second female channels 140 nestingly receives a corresponding one of the rear slotted projections 112. Additionally, an internal circumferential surface of each of the charging receptacles 18 preferably includes at least two guide ribs 148, wherein a single guide rib is vertically disposed at each of the top and bottom arcuate end portions 102, 104, and are configured to oppose one another along the internal circumference of the charging receptacle. A plurality of side wall guide ribs 150, preferably three, are also disposed on the internal circumferential surface of the charging receptacle 18 along a side wall portion. Opposite the side wall portion containing the side wall guide ribs 150 is a guide channel 152 defined on each side by generally planar raised portions 154. The stem connector 96 of the battery pack 31 includes corresponding projections and recesses that engage these configurations on the internal circumferential surface of the charging receptacle. In this manner, the stem connector 96 of each battery pack 31 is mechanically coupled to a respective one of the charging receptacles 18 disposed on the adapter apparatus.

As with the stem connector 20 and the female slot 30, electrical coupling between the stem connector 96 of the battery pack 31 and one of the charging receptacles is also established via a plurality of terminal connectors disposed within the various projections of each. More specifically, the stem connector 96 includes terminal contacts 162 disposed within a slot (not shown) disposed within at least one of the female cavities 128, a front slot (not shown) within the top channel 134, and side slots (not shown) of each of the pair of second female channels 140. The terminal contacts 162 of the preferred embodiment are made of nickel-plated steel, but it is contemplated that the terminal contacts may be made from any electrically conductive metal typically used in batteries. The terminal contacts 162 engage a respective slot or cavity disposed within one of the charging receptacles 18. More specifically, the slot portion 118 disposed within the rear slotted projections 112 matingly engage the terminal contacts 162 within the second female channels 140, the cavities 120 disposed within the middle projections 114 matingly engage the terminal contacts 162 of the female cavities 128, and the slot portion 122 of the front slotted projection 116 matingly engages the terminal contact 162 within the top channel 134.

Figure 2:
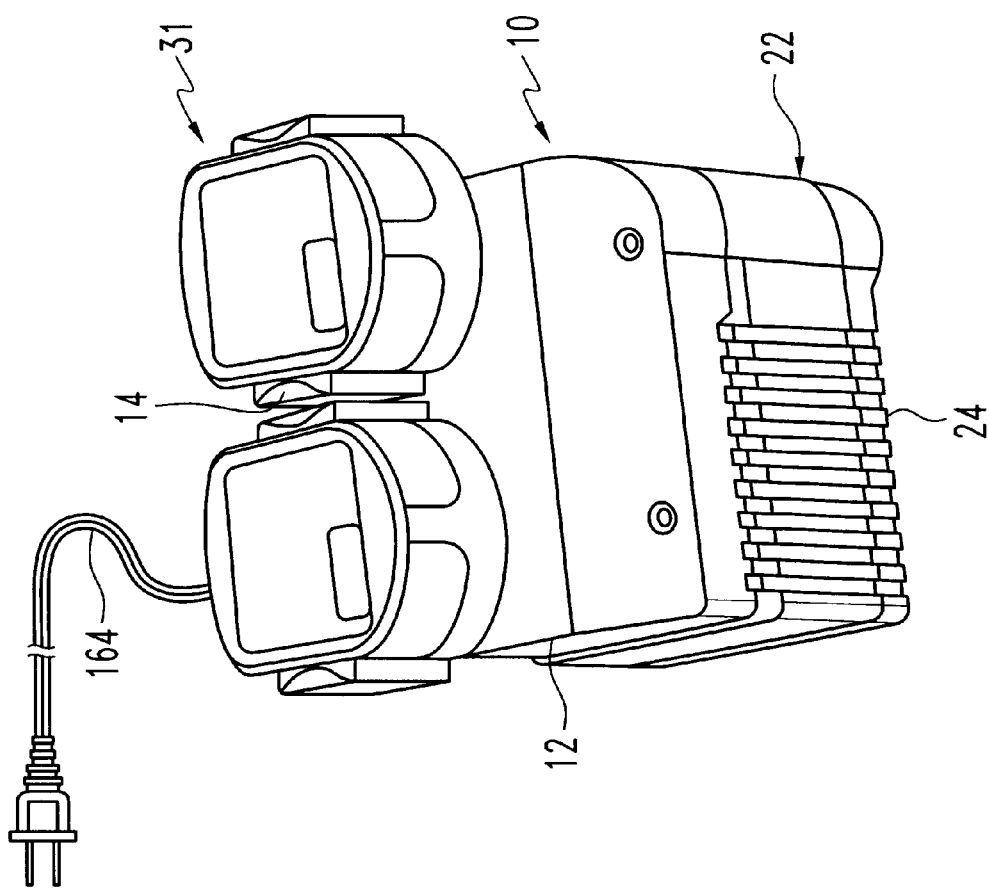
FIG. 2 is a top perspective view of the adapter apparatus illustrated in FIG. 1 in use with a battery charger and battery packs.
Figure 3:
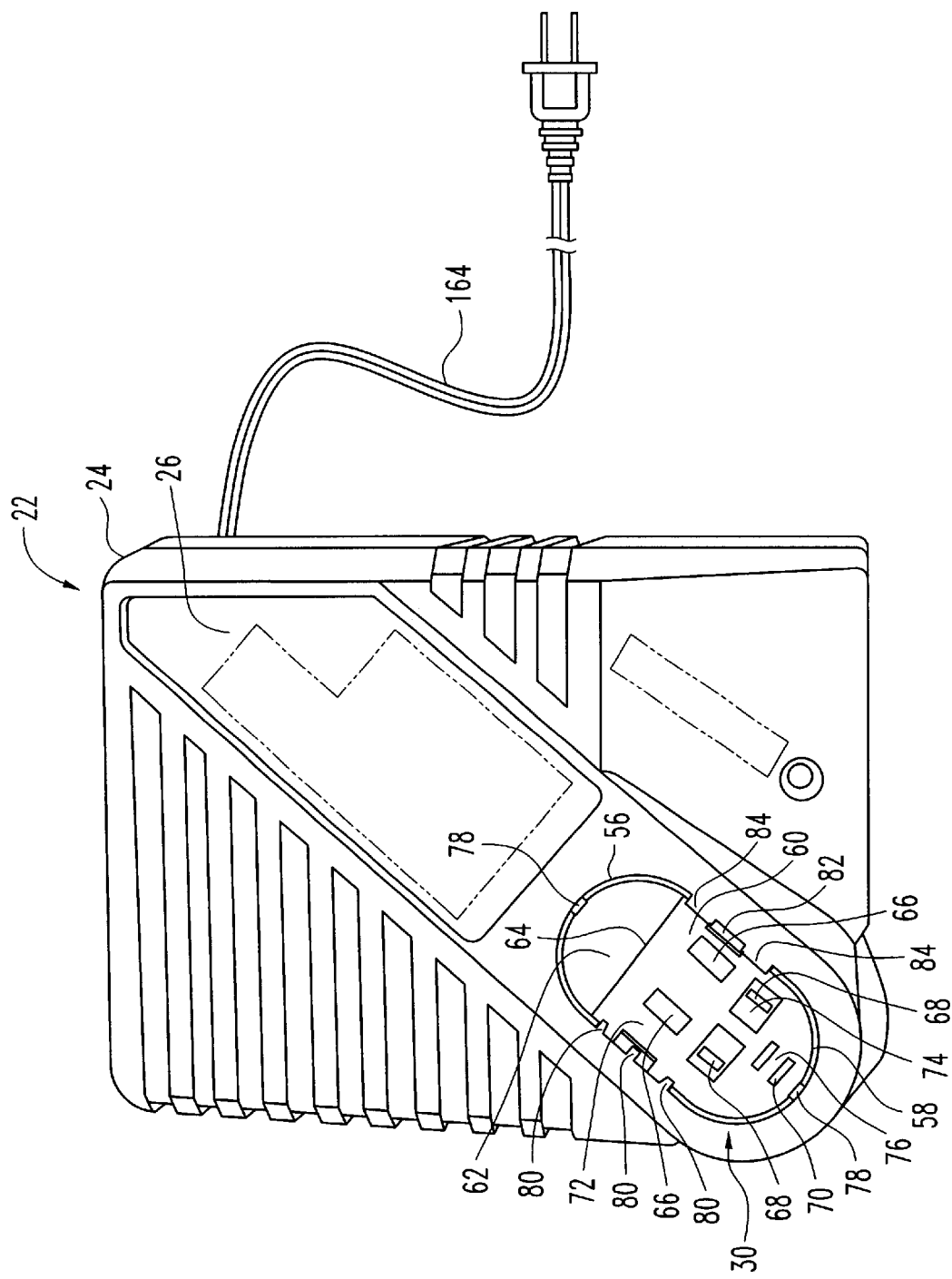
FIG. 3 is a top view of the battery charger illustrated in FIG. 1.

Thus, as shown in FIGS. 1 and 2, when the adapter apparatus 10 of the instant apparatus is in use, the stem connector 20 of the adapter apparatus is mechanically and electrically coupled to the female slot 30 of the charger apparatus 22. The charger apparatus is electrically coupled to an AC power outlet or other suitable power source via a power cord 164 extending from the charger apparatus 22. Either prior to or following mating of the adapter apparatus to the charger apparatus 22, one or more battery packs 31 are each coupled to a respective charging receptacle 18 disposed on the adapter apparatus. In this manner, the adapter apparatus 10 is electrically and mechanically coupled to both the charger apparatus 22 and one or more battery packs 31.

Figure 9:
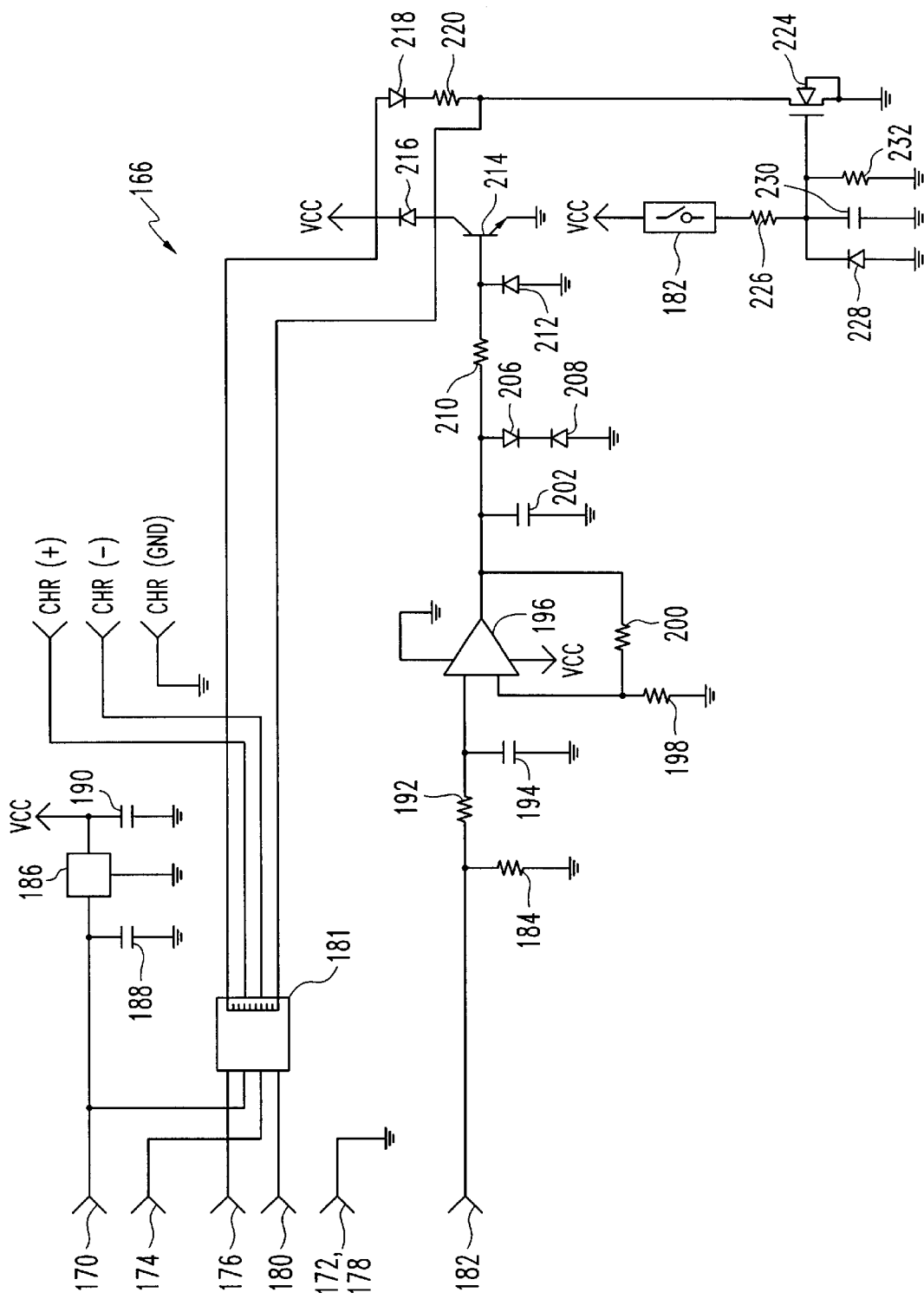
FIG. 9 is a circuit diagram for the internal electronic circuitry of the adapter apparatus illustrated in FIG. 1.

Turning now to FIG. 9, charging of the battery packs coupled to the adapter apparatus 10 of the instant invention is promoted by internal electronic circuitry within the adapter apparatus. While the instant invention contemplates use of circuitry capable of charging numerous charging multiple batteries, a circuit diagram for charging two battery packs 31 is shown and will be described. Very generally, the internal electronic circuitry, designated generally at 166, senses the relative charge of each of the two battery packs 31 disposed within the charging receptacles 18 of the adapter apparatus 10, and is capable of sending a charging current to one or the other battery pack. The internal electronic circuitry is capable of sending various charge intensities, and may specifically send either a "fast charge" or a "trickle charge." Also preferably included within the internal electronic circuitry 166 is circuitry for visual feedback to indicate which battery pack is being charged and the relative state of charge of that battery pack. A preferred example of this visual feedback is a light emitting diode (LED) display 168 (best shown in FIG. 1). Additionally, the preferred embodiment of the instant invention includes internal electronic circuitry 166 allowing the adapter to pass a "trickle charge" for maintaining a full charge on at least one of the battery packs 31, thereby maintaining a full charge on both battery packs for an indefinite period of time.

The internal electronic circuitry 166 will operate with all existing one-hour chargers and battery packs currently manufactured by Bosch or Skil. One-hour chargers have three connections: battery plus, battery minus, and negative temperature coefficient (NTC) thermistor. Thus, the internal electronic circuitry of the instant invention includes connections for first battery plus 170, first battery minus 172, first battery NTC 174, second battery plus 176, second battery minus 178, and second battery NTC 180. The internal electronic circuitry 166 senses the difference between fast and trickle charging and switches over from the first battery pack to the second battery pack.

Transformer chargers typically lack an open-circuit voltage, while the switching type one-hour chargers used with the preferred embodiment of the instant invention have a predetermined open-circuit voltage, for example 42V. Thus, circuit energy originates from the battery pack 31 itself.

The internal electronic circuitry 166 used with the preferred embodiment uses a double pole double throw (DPDT) relay 181. Normally closed contacts charge one of the batteries in a known manner. When a start button 182 is activated by a user, the DPDT relay 181 is switched to the second battery and into the "fast charge" mode. Preferably, no charge is sent to the first battery pack until the second battery pack is completely charged, and then it is automatically sent back to the first battery. Following the complete "fast charge" of both batteries, the first battery continues to receive a trickle charge for an indefinite period of time. The DPDT relay 181 switches the battery plus and NTC contacts, and the battery minus is placed at common ground.

Preferably, a current sensitive resistor 184 senses the charging current. A 1-ampere charge rate will yield about a 10-millivolt (mV) signal; a 2.5 ampere charge rate will create a 25-mV signal, while a 10-amp charge rate will have a 100-mV signal. The second battery NTC 180 signal is preferably 10 millivolts above ground.

To accommodate a predetermined battery pack voltage range, preferably a range from 12 to 24 volts, a voltage regulator integrated circuit 186 is used in the internal electronic circuitry 166 to regulate the circuit electronics at a constant 12 volts. However, if a lower battery voltage is desired, the voltage regulator 186 may be reduced, for example, to 9 volts, but the relay coil energizing current would consequently increase.

Capacitors 188, 190 are included in circuit with the regulator 186 for input and output filtering.

A low pass filter comprising a resistor 192 and a capacitor 194 is connected between the current sensing resistor 184 and an operational amplifier 196. The low pass filter is configured to attenuate any signal above 1 kHz, and the filtered signal is fed to the operational amplifier 196 to amplify the signal. Resistors 198, 200 define the amount of the amplification as is known in the art. For example, a 10-mV signal will preferably be amplified to approximately 1 volt, and a 25-mV signal will be amplified to about 2.5 volts.

However, while the transformer signal is discontinuous and will exceed 1 volt after amplification, the switching power supply has a steady, continuous signal when amplified. A capacitor 202 is a filter capacitor, and is connected to the output of the operational amplifier 196 and produces an output signal that is continuous with a triangular ripple.

However, this signal is periodically interrupted by the charger microprocessor 204 to measure the battery voltage. The capacitor 202 keeps the relay coil closed during this brief interruption.

Diodes 206 and 208 are connected in series to clip the voltage above 0.9 volt, with the diode 208 being a Schottky diode and preferably exhibiting a 0.2 voltage drop. The combination of the capacitor 202 and the voltage clipping circuit helps to prevent relay chattering when the fast charge signal converts to trickle charge. The trickle charge current preferably has the same 120 Hz current pulse as the fast charge mode, but a lower duty cycle of approximately 5%.

A resistor 210 is a voltage-dropping resistor and a diode 212 protects the reverse base-emitter transistor junction of a transistor 214 by limiting the base emitter voltage to −0.7 volt. The transistor 214 is a relay driver transistor that energizes the relay coil during fast charge and shuts down during trickle charge.

A diode 216 absorbs the relay coil energy when the relay coil is deenergized, and this helps to prevent voltage spikes. A diode 218 is an LED, which lights during fast charge of the second battery pack. A resistor 220 limits the LED current to a safe operating level.

The master start push button 182 energizes a field effect transistor (FET) 224, which in turn energizes the DPDT relay 181 for about 3 seconds to allow the current sensing signal adequate time to continue driving the relay coil. A resistor 226 drops the 12-volt power supply voltage to preferably 5.1 volts and a diode 228 is a 5.1-volt zener diode. The energy is stored by a capacitor 230. The FET 224 is kept on until the voltage falls exponentially below the gate-source threshold level. A resistor 232 depletes the remaining energy in the capacitor 230.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

What is claimed is:

1. A splitting adapter for a battery charger having a power cord for connection to an electrical source, the charger having a single charging receptacle for receiving a connector extension of a battery pack of the type used with cordless power tools, said adapter comprising:
   a housing having a housing connector extension with a sufficiently similar structural and electrical configuration as the connector extension of the battery pack so that said housing can be electrically connected to the battery charger when said housing connector extension is inserted into the charging receptacle;
   at least two charging receptacles, each of which is configured to receive a battery pack connector extension, said charging receptacles being spaced from one another a sufficient distance that the battery packs will not interfere with one another when inserted into said adapter, wherein said charging receptacles of said adapter are configured to have substantially the same dimensions as the charging receptacle of the battery charger.

2. The adapter of claim 1 wherein the battery charger and said housing of said adapter each have a predetermined shape.

3. The adapter of claim 1 wherein the battery charger and said housing are generally rectangular, in shape.

4. The adapter of claim 1 wherein said housing of said adapter is configured to have coextensive dimensions with the battery charger.

5. The adapter of claim 1 wherein said charging receptacles are disposed on said adapter to be parallel with one another and at a generally 45° angle to the charging receptacle of the battery charger.

6. The adapter of claim 1 further comprising circuitry for sensing a relative charge on a battery.

7. The adapter of claim 1 further comprising circuitry for maintaining a full charge on the battery in each of said at least two charging receptacles.

8. The adapter of claim 1 further comprising a visual feedback display to indicate the relative state of charge of the battery in each of said at least two charging receptacles.

9. A method of simultaneously charging multiple battery packs of the type used with cordless power tools wherein a battery charger having a single charging receptacle for receiving a single battery pack has a power cord connecting the battery charger directly to a power source, said method including:
   connecting the battery charger to the power source;
   providing a splitting adapter;
   providing said splitting adapter with a housing connector extension and at least two charging receptacles;
   coupling said housing connector extension and the single charging receptacle of the battery charger;
   coupling a battery pack to each of said at least two charging receptacles.

10. A splitting adapter for a battery charger having a single charging receptacle for receiving a protrusion on a battery of the type used with cordless power tools and an AC connector for plugging into an electrical outlet, said adapter comprising:
    a housing;
    coupling means for connecting said housing to the battery charger; and
    dual charging means for simultaneously receiving at least two batteries on said housing, wherein said dual charging means are configured to have substantially the same dimensions as said coupling means.

11. A splitting adapter for a battery charger having a power cord for connection to an electrical source, the charger having a single charging receptacle for receiving a connector extension of a battery pack of the type used with cordless power tools, said adapter comprising:
    a housing having a housing connector extension with a sufficiently similar structural and electrical configuration as the connector extension of the battery pack so that said housing can be electrically connected to the battery charger when said housing connector extension is inserted into the charging receptacle;
    at least two charging receptacles, each of which is configured to receive a battery pack connector extension, said charging receptacles being spaced from one another a sufficient distance that the battery packs will not interfere with one another when inserted into said adapter, and wherein said adapter is configured to have coextensive dimensions with the battery charger.

12. A splitting adapter for a battery charger having a power cord for connection to an electrical source, the charger having a single charging receptacle for receiving a connector extension of a battery pack of the type used with cordless power tools, said adapter comprising:
    a housing having a housing connector extension with a sufficiently similar structural and electrical configuration as the connector extension of the battery pack so that said housing can be electrically connected to the battery charger when said housing connector extension is inserted into the charging receptacle;

at least two charging receptacles, each of which is configured to receive a battery pack connector extension, said charging receptacles being spaced from one another a sufficient distance that the battery packs will not interfere with one another when inserted into said adapter, and wherein said charging receptacles are disposed on said adapter to be parallel with one another and at a generally 45° angle to the charging receptacle of the battery charger.

* * * * *